United States Patent
Wu et al.

(10) Patent No.: US 10,801,839 B2
(45) Date of Patent: Oct. 13, 2020

(54) ACCELERATOR

(71) Applicant: CSMC TECHNOLOGIES FAB2 CO., LTD., Wuxi New District, Jiangsu (CN)

(72) Inventors: Huagang Wu, Jiangsu (CN); Xueyan Wang, Jiangsu (CN)

(73) Assignee: CSMC TECHNOLOGIES FAB2 CO., LTD., Wuxi New District (CN)

( * ) Notice: Subject to any disclaimer, the term of this patent is extended or adjusted under 35 U.S.C. 154(b) by 385 days.

(21) Appl. No.: 15/747,882

(22) PCT Filed: May 11, 2016

(86) PCT No.: PCT/CN2016/081659
§ 371 (c)(1),
(2) Date: Jan. 26, 2018

(87) PCT Pub. No.: WO2017/016273
PCT Pub. Date: Feb. 2, 2017

(65) Prior Publication Data
US 2018/0224281 A1 Aug. 9, 2018

(30) Foreign Application Priority Data
Jul. 28, 2015 (CN) .......................... 2015 1 0452737

(51) Int. Cl.
*G01C 19/5776* (2012.01)
*G01P 15/08* (2006.01)
(Continued)

(52) U.S. Cl.
CPC ...... *G01C 19/5776* (2013.01); *G01P 15/0802* (2013.01); *G01P 15/12* (2013.01); *G01P 15/18* (2013.01); *G05B 2219/36159* (2013.01)

(58) Field of Classification Search
None
See application file for complete search history.

(56) References Cited

U.S. PATENT DOCUMENTS

| 5,287,033 A * | 2/1994 | Morton | G01C 19/567 |
| | | | 310/316.01 |
| 7,069,798 B2 * | 7/2006 | Rioux | G01V 1/16 |
| | | | 702/141 |
| 7,443,257 B2 * | 10/2008 | Demma | G01C 19/56 |
| | | | 331/10 |

FOREIGN PATENT DOCUMENTS

| CN | 101271125 A | 9/2008 |
| CN | 102650854 A | 8/2012 |

(Continued)

OTHER PUBLICATIONS

Carley et al. High-Speed Low-Power Integrating CMOS Sample-and-Hold Amplifier Architecture Custom Integrate Circuits Conference, 1995 (Year: 1995).*

(Continued)

*Primary Examiner* — Roy Y Yi
(74) *Attorney, Agent, or Firm* — Polsinelli PC

(57) ABSTRACT

An accelerator comprises: an accelerometer (100), configured to detect an acceleration of a motion of a carrier and output a corresponding electrical signal; a sampling and low-pass filter (200), coupled to the accelerometer (100), and configured to sample the electrical signal regularly and filter a noise from the electrical signal; an amplifier (300), configured to amplify the electrical signal after filtering the noise; an analog-to-digital converter (400), configured to convert the amplified electrical signal into a digital signal; a function control module (500), configured to process the digital signal and output a control signal to control the analog-to-digital converter (400), the amplifier (300), and the sampling and low-pass filter (200); and an oscillator module (600), configured to output, according to the control signal, a sampling signal to the sampling and low-pass filter (200), so as to control the sampling and low-pass filter (200) to sample the electrical signal regularly.

7 Claims, 3 Drawing Sheets

(51) Int. Cl.
*G01P 15/12* (2006.01)
*G01P 15/18* (2013.01)

(56) References Cited

FOREIGN PATENT DOCUMENTS

| | | |
|---|---|---|
| CN | 103495263 A | 1/2014 |
| CN | 203494059 U | 3/2014 |
| CN | 104698871 A | 6/2015 |
| JP | 2000338127 A | 12/2000 |

OTHER PUBLICATIONS

Sampling and Aliasing (Year: 2010).*
Cimbala, John, How to Analyze the Frequency Content of a Signal 2013 (Year: 2013).*
Chinese Office Action dated Sep. 28, 2018 in the corresponding counterpart patent application No. 2015104527371.
International Search Report and Written Opinion dated Aug. 8, 2016 issued in the corresponding International Application No. PCT/CN2016/081659, pp. 1-9.

* cited by examiner

ACCELERATOR

CROSS REFERENCE TO RELATED APPLICATIONS

This application is a National Phase filing under 35 U.S.C. § 371 of PCT/CN2016/081659 filed on May 11, 2016, and this application claims priority to Chinese Application No. 201510452737.1 filed on Jul. 28, 2015. The entire contents of each application are hereby incorporated by reference.

BACKGROUND OF THE INVENTION

An accelerator is typically used in a mobile phone or a wearable device, which is required to be of low power consumption and high anti-interference. A counter weight is typically included in an accelerometer, and the detection of the acceleration is affected when the resonant frequency of the counter weight is within an audio range. As such, it is necessary to eliminate the audio interference with a low-pass filter, so as to obtain a relatively accurate acceleration signal. In a conventional accelerator, to adjust the operation frequency bandwidth of the low-pass filter, a multiplexer is required to select from multiple resistors or capacitors, whereby the power consumption and the cost of the entire accelerator is relatively high.

SUMMARY OF THE INVENTION

Accordingly, it is necessary to provide an accelerator of low power consumption and low cost.

An accelerator includes: an accelerometer configured to detect acceleration of a motion of a carrier and output a corresponding electric signal; a sampling low-pass filter coupled to the accelerometer and configured to periodically sample the electric signal and filter a noise from the electric signal; an amplifier coupled to the sampling low-pass filter and configured to amplify the electric signal after filtering the noise; an analog-to-digital (AD) converter coupled to the amplifier and configured to convert the amplified electric signal into a digital electric signal; a function control module coupled to the AD converter, the amplifier, and the sampling low-pass filter respectively; the function control module is configured to process the digital electric signal and output a function control signal to control the AD converter, the amplifier, and the low-pass filter; and an oscillator module coupled to the function control module and the sampling low-pass filter respectively and configured to output a sampling signal to the sampling low-pass filter according to the function control signal to control the sampling low-pass filter to periodically sample the electric signal.

A method of controlling an accelerator includes: detecting acceleration of a motion of a carrier and output a corresponding electric signal; sampling the electric signal periodically and filtering a noise in the electric signal; amplifying the electric signal after filtering the noise; converting the electric signal amplified into a digital electric signal; processing the digital electric signal and outputting a function control signal; and outputting a sampling signal according to the function control signal; wherein the sampling signal is configured to control a periodical sampling of the electric signal.

According to the foregoing accelerator, by way of sampling through the sampling low-pass filter, the electrical signal output by the accelerometer is filtered, such that the operation frequency bandwidth of the sampling low-pass filter can be adjusted by adjusting the sampling signal through the oscillator module, and the multiplexer is not needed to select from several resistors or capacitors, such that the areas of resistors and capacitors is saved and the cost is low. In addition, as the oscillator module is not required to be continuously enabled, the power consumption of the accelerometer is also lowered accordingly.

BRIEF DESCRIPTION OF THE DRAWINGS

The technical solutions of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

DETAILED DESCRIPTION OF THE EMBODIMENTS

Figure 1:
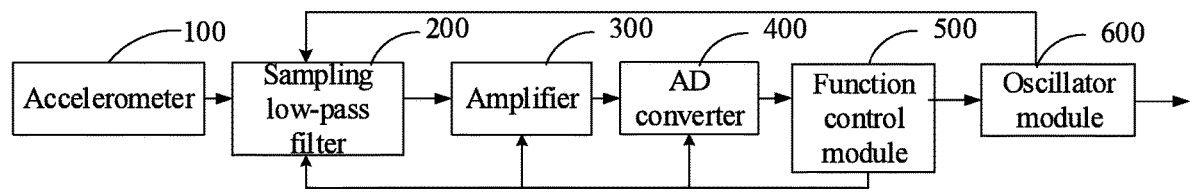
FIG. 1 is a block diagram of an accelerator according to an embodiment.

The present invention will be described in the following with reference to the accompanying drawings and the embodiments. Preferable embodiments are presented in the drawings. However, the present invention can be implemented in various forms and is not limited to the embodiments disclosed herein. Rather, the various embodiments is provided to facilitate a thorough and complete understanding of the disclosure.

FIG. 1 is a block diagram of an accelerator according to an embodiment. The accelerator includes an accelerometer 100, a sampling low-pass filter 200, an amplifier 300, an analog-to-digital (AD) converter 400, a function control module 500, and an oscillator module 600.

The accelerometer 100 is mounted in a carrier and is configured to detect acceleration of a motion of the carrier and then output an electric signal having certain functional relation with the acceleration. The sampling low-pass filter 200 is coupled to the accelerometer 100 and is configured to sample the electric signal periodically and filter a noise in the electric signal generated by, such as, the audio resonance, etc. The amplifier 300 is coupled to the sampling low-pass filter 200 and is configured to amplify the electric signal after filtering the noise. The AD converter 400 is coupled to the amplifier 300 and is configured to convert the amplified electric signal into a digital electric signal. The function control module 500 is coupled to the AD converter, the amplifier, and the sampling low-pass filter respectively. The function control module 500 is configured to process the digital electric signal and output a function control signal to control the AD converter 400, the amplifier 300, and the low-pass filter 200. The oscillator module 600 is coupled to the function control module 500 and the sampling low-pass filter 200 respectively and is configured to output a sampling signal to the sampling low-pass filter 200 according to the function control signal to control the sampling low-pass filter 200 to sample the electric signal periodically.

Figure 2:
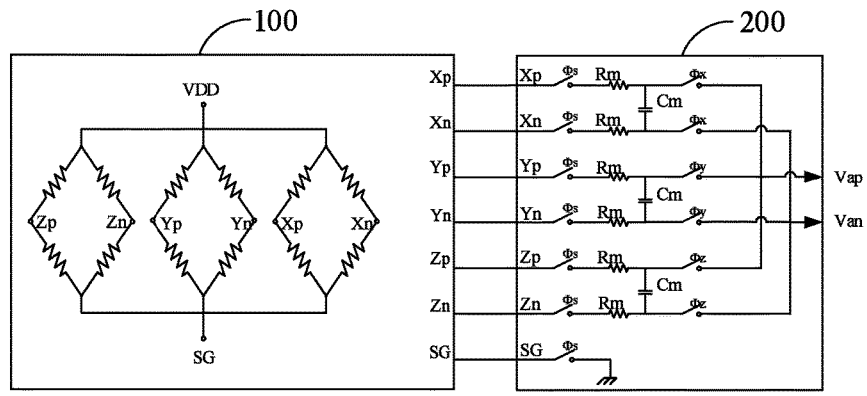
FIG. 2 is a schematic diagram of a connection of the accelerator and a sampling low-pass filter in FIG. 1.

FIG. 2 is a schematic diagram of a connection of the accelerator and a sampling low-pass filter in FIG. 1. In the illustrated embodiment, the accelerometer adopts an electrical bridge structure, and every four resistors form an electrical bridge. An output end of the accelerometer 100 includes output ends Xp, Xn, Yp, Yn, Zp, Zn respectively led out from three electrical bridges, and a shared output end SG of the three electrical bridges.

Figure 3:
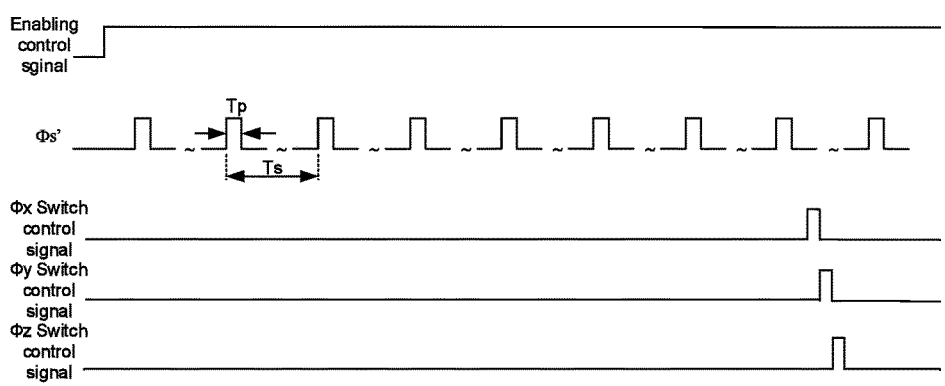
FIG. 3 is a control sequence chart of a sampling low-pass filter in FIG. 2.

The sampling low-pass filter 200 includes a resistor Rm, a capacitor Cm, and a sampling control switch Φs. The resistor Rm and the capacitor Cm form a first order low-pass filter, the sampling control switch Φs is coupled to an output end of the accelerometer 100 so as to sample, at fixed time intervals, the electric signal output by the accelerometer 100, the sampling control time sequence is illustrated in FIG. 3.

Assuming a time interval for the sampling control switch Φs to sample is Ts, the effective duration for each sampling is Tp, the resistance of the resistor Rm is R, the capacitance of the capacitor Cm is C, then the time constant and the cut-off frequency corresponding to the sampling low-pass filter 200 are respectively:

$T_s/T_p \times 2RC$ and $T_p/T_s \times 1/4\pi RC$

By regulating the ratio of Tp to Ts, a dynamic regulation can be effected to the bandwidth of the sampling low-pass filter 200, such that no multiplexer is required to select from multiple resistors or capacitors, and areas in the silicon wafer to be taken by the resistor or the capacitor can be saved.

Figure 4:
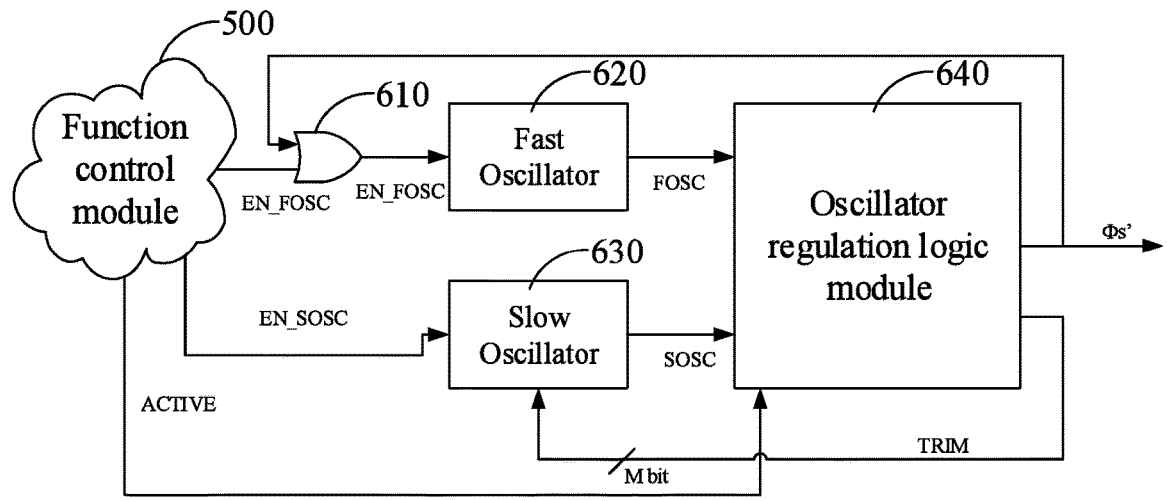
FIG. 4 is a block diagram of a function control module and an oscillator module in FIG. 1.

FIG. 4 is a block diagram of a function control module and an oscillator module in FIG. 1. The function control module 500 is mainly integrated with an analog interface in the accelerometer, and is also integrated with a control signal logic circuit including the amplifier 300, an AD converter 400, and a sampling low-pass filter 200, so as to generate a control signal to control the foregoing circuits. The function control module 500 can be implemented by a single chip microcomputer with corresponding control signal logic circuit burnt thereon or by a corresponding control chip.

The oscillator module 600 includes an OR gate 610, a fast oscillator 620, a slow oscillator 630, and an oscillator regulation logic module 640. Where, a first input end of the OR gate 610 is coupled to a fast oscillator enabling signal output end of the function control module 500, so as to receive a fast oscillator enabling signal EN_FOSC output by the function control module 500. An input end of the slow oscillator 630 is coupled to an slow oscillator enabling signal output end of the function control module 500, so as to receive a slow oscillator enabling signal EN_SOSC. An output end of the OR gate 610 is coupled to the fast oscillator 620, an output end of the fast oscillator 620 is coupled to a fast oscillator frequency input pin FOSC of the oscillator logic module 640, so as to receive a fast oscillator frequency signal FOSC. An output end of the slow oscillator 630 is coupled to an slow oscillator frequency input pin SOSC of the oscillator regulation logic module 640, so as to receive a slow oscillator frequency signal SOSC. A second input end of the OR gate 610 is coupled to an output end of the oscillator regulation logic module 640, a working pin of the function control module 500 is directly coupled to the oscillator regulation logic module 640, so as to output a function control signal ACTIVE to the oscillator regulation logic module 640.

In the illustrated embodiment, the slow oscillator 630 has a frequency regulation with M digits, the slow oscillator 630 can generate $2^M$ kinds of frequency settings according to the required frequency range and accuracy design.

The oscillator regulation logic module 640 is configured to generate a sampling signal Φs' and frequency regulation signal TRIM, the sampling signal Φs' only allows the fast oscillator 620 to be enabled when the Tp is high (within an effective sampling time) or the function control module 500 is in motion while the fast oscillator 620 is not enabled in other times, i.e., being shut off. The frequency regulation signal TRIM is configured to regulate the output frequency of the slow oscillator 630.

Further, the design requirement of the slow oscillator 630 is: when all the set values of the frequency regulation signal TRIM are 0, the output frequency of the slow oscillator 630 shall not be lower than its required frequency, and the output frequency is lowered when the frequency regulation signal TRIM set values are increased; and when all the frequency regulation signal TRIM set values are 1, the output frequency is no higher than the required frequency. The digits of M is defined by the accuracy required by the calibration of the fast oscillator 620 and the slow oscillator 630. By an automatic calibration of the output frequency, the design challenge is greatly reduced.

In order to reduce the power consumption, the output frequency of the slow oscillator 630 is far below the output frequency of the fast oscillator 620. The output frequency of the fast oscillator 620 is dependent on the data output on the application or the design specification. Assuming that the ratio of the output frequency of the fast oscillator 620 to the output frequency of the slow oscillator 630 is FRATIO (N digits), the FRATIO here is designed to be an integer value greater than 100.

It should be understood that in other embodiments, the FRATIO can be adjusted in view of the actual application, such as being adjusted to be an integer value less than 100.

Figure 5:
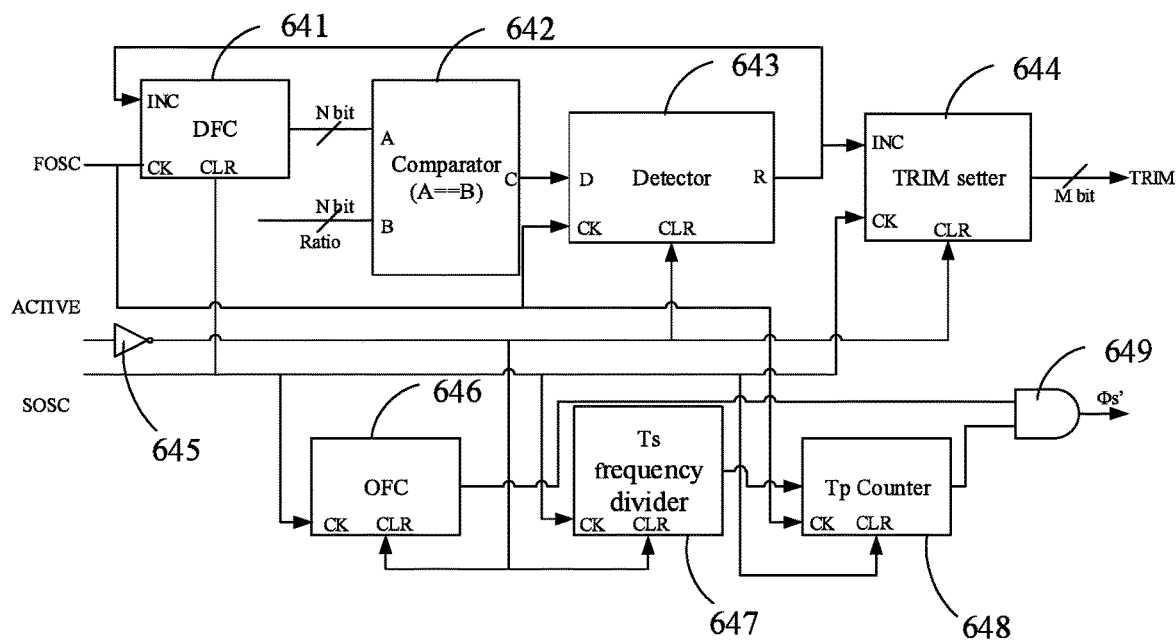
FIG. 5 is a block diagram of an oscillator regulation logic module in FIG. 4.

FIG. 5 is a block diagram of an oscillator regulation logic module in FIG. 4. The oscillator regulation logic module 640 includes a dominant frequency counter (DFC) 641, a comparator 642, a detector unit 643, a TRIM setter 644, an inverter 645, an output frequency controller (OFC) 646, a Ts frequency divider 647, a Tp counter 648 and, a first AND gate 649.

The output end of the fast oscillator 620 is coupled to a clock pulse input end CK of the dominant frequency counter 641, a clock pulse input end CK of the detector unit 643 and a clock pulse input end CK of the Tp counter respectively; an output end of the dominant frequency counter 641 is coupled to an input end D of the detector unit 643 through the comparator 642; an output end R of the detector unit 643 is coupled to an external input end INC of the dominant frequency counter 641 and an external input end INC of the TRIM setter 644 respectively; a frequency regulation signal TRIM is output from an output end of the TRIM setter 644 and feedback to the slow oscillator 630;

The control signal ACTIVE of the function control module 500, after inversion by the inverter 645, is output to the detector unit 643, the TRIM setter 644, the output frequency controller 646 and the clear end CLR of the Ts frequency divider 647;

An output end of the slow oscillator 630 is coupled to a clear end CLR of the dominant frequency counter 641, a clock pulse input end CK of the output frequency controller 646, a clock pulse input end CK of the Ts frequency divider 647, a clear end CLR of the Tp counter 648 and a clock pulse input end CK of the TRIM setter 644 respectively; and two input ends of the first AND gate 649 are coupled to output ends of the output frequency controller 646 and the Tp counter 648 respectively, and an output end of the first AND gate 649 is configured to output the sampling signal Φs'.

The operation principle of the oscillator regulation logic module 640 will be described with reference to FIGS. 4 and 5.

First of all, when the output of the slow oscillator 630 is high, the timing of the dominant counter 641 is cleared to be 0. When the output of the slow oscillator 630 is low, the dominant frequency counter 641 is allow to count, the clock signal output by the fast oscillator 620 will cause the counting of the dominant frequency counter 641 increase by 1 until the result of the comparator 642 is inverted, then the detector unit 643 will lock and store the inverted signal such that the dominant counter 641 and the TRIM setter 644 stop increasing, then the TRIM setter 644 locks and stores the parameters required to set the slow oscillator 630. When the detector unit 643 has not yet detected the inverted signal of the comparator 642, the dominant frequency counter 641 is reset by the high level of the slow oscillator 630, then the set value in the TRIM setter 644 will be increased by 1, the increase of the parameter required by the slow oscillator 630 will cause the oscillate frequency of the slow oscillator 630 to lower, the detecting work of the oscillator regulation logic module 640 is be repeated until a correct parameter is set up to the slow oscillator 630, the output of the slow oscillator 630 can be configured to control the output frequency eventually.

When the output of the slow oscillator 630 is calibrated, for one thing, it is a clock for the output frequency controller 646 and sends effective signals according to the data output frequency requirement; for another thing, it is a clock for the Ts divider 647 and, at an interval of Ts, sends an enabling signal to start the fast oscillator 620 to generate a clock and starts the timing of the Tp counter 648. The timing cycle of the Tp counter 648 can be adjusted according to the frequency variation of the low-pass filter, the output computed by the first AND gate 649 to generate a sampling signal Φs'.

As the accelerometer 1040 only consumes energy when the sampling signal Φs' is high, and the fast oscillator 620 performs the required function only during some of the time. As such, the accelerator can operate with a relatively low power consumption.

Figure 6:
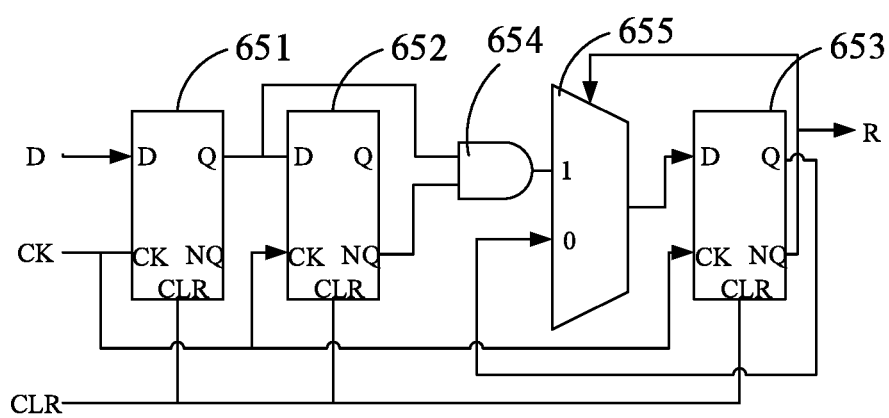
FIG. 6 is schematic diagram of a detector unit in FIG. 5.

FIG. 6 is schematic diagram of a detector unit in FIG. 5. The detector unit 649 includes a first D type memory 651, a second D type memory 652, a third D type memory 653, a second OR gate 654 and a multiplexer 655.

In particular, an output end Q of the first D type memory 651 is coupled to an input end D of the second D type memory 652 and a first input end of the second OR gate 654 respectively. A second input end of the second OR gate 654 is coupled to an invert output end NQ of the second D type memory 652, an output end of the second OR gate 654 is coupled to one of input ends of the multiplexer 655. An output end of the multiplexer 655 is coupled to an input end D of the third D type memory 653; an output end Q and an invert output end NQ of the third D type memory 653 are both coupled to the input ends of the multiplexer 655. Where the invert output end NQ of the third D type memory 653 serves as an output end of the entire detector unit 649.

When an input electrical level of the first D type memory 651 is changed from low to high, after a function combination of the second AND gate 654 and a multiplexer 655, a result will be locked and stored into a third D type memory 653.

According to the foregoing accelerator, by way of sampling through the sampling low-pass filter 200, the electrical signal output by the accelerometer 100 is filtered, the operation frequency bandwidth of the sampling low-pass filter 200 can be adjusted by adjusting the sampling signal via the oscillator module 600, and the multiplexer is not needed to select from several resistors or capacitors, such that the areas of resistors and capacitors is saved and the cost is low. In addition, as the oscillator module 600 is not required to be continuously enabled, the power consumption of the accelerometer is also lowered accordingly.

The different technical features of the above embodiments can have various combinations which are not described for the purpose of brevity. Nevertheless, to the extent the combining of the different technical features do not conflict with each other, all such combinations must be regarded as being within the scope of the disclosure.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. An accelerator comprising:
an accelerometer configured to detect acceleration of a motion of a carrier and output a corresponding electric signal;
a sampling low-pass filter coupled to the accelerometer and configured to periodically sample the electric signal and filter a noise from the electric signal;
an amplifier coupled to the sampling low-pass filter and configured to amplify the electric signal after filtering the noise;
an analog-to-digital (AD) converter coupled to the amplifier and configured to convert the amplified electric signal into a digital electric signal;
a function control module coupled to the AD converter, the amplifier, and the sampling low-pass filter, respectively, wherein the function control module is configured to process the digital electric signal and output a function control signal to control the AD converter, the amplifier, and the sampling low-pass filter; and
an oscillator module coupled to the function control module and the sampling low-pass filter respectively and configured to output a sampling signal to the sampling low-pass filter according to the function control signal to control the sampling low-pass filter to periodically sample the electric signal;
wherein the sampling low-pass filter comprises a resistor, a capacitor, and a sampling control switch; the resistor and the capacitor form a first order low-pass filter, the sampling control switch is coupled to an output end of the accelerometer to sample, at fixed intervals, the electric signal output from the accelerometer.

2. An accelerator comprising:
an accelerometer configured to detect acceleration of a motion of a carrier and output a corresponding electric signal;
a sampling low-pass filter coupled to the accelerometer and configured to periodically sample the electric signal and filter a noise from the electric signal;
an amplifier coupled to the sampling low-pass filter and configured to amplify the electric signal after filtering the noise;

an analog-to-digital (AD) converter coupled to the amplifier and configured to convert the amplified electric signal into a digital electric signal;

a function control module coupled to the AD converter, the amplifier, and the sampling low-pass filter, respectively; wherein the function control module is configured to process the digital electric signal and output a function control signal to control the AD converter, the amplifier, and the sampling low-pass filter; and an oscillator module coupled to the function control module and the sampling low-pass filter respectively and configured to output a sampling signal to the sampling low-pass filter according to the function control signal to control the sampling low-pass filter to periodically sample the electric signal;

wherein the oscillator module comprises an OR gate, a fast oscillator, a slow oscillator, and an oscillator regulation logic module; a first input end of the OR gate and an input end of the slow oscillator are both coupled to the function control module; an output end of the OR gate is coupled to the fast oscillator; an output end of the fast oscillator and an output end of the slow oscillator are both coupled to the oscillator regulation logic module; a second end of the OR gate is coupled to an output end of the oscillator regulation logic module; the oscillator regulation logic module is configured to adjust a frequency of the slow oscillator; and the oscillator regulation logic module is further configured to control the enabling of the fast oscillator and output the sampling signal to the sampling low-pass filter.

3. The accelerator according to claim 2, wherein an output frequency of the slow oscillator is lower than an output frequency of the fast oscillator.

4. The accelerator according to claim 3, wherein a ratio of the output frequency of the fast oscillator to the output frequency of the slow oscillator is an integer greater than 100.

5. The accelerator according to claim 2, wherein the oscillator regulation logic module comprises a dominant frequency counter, a comparator, a detector unit, a TRIM setter, an inverter, an output frequency controller, a Ts frequency divider, a Tp counter and a first AND gate;

wherein the output end of the fast oscillator is coupled to a clock pulse input end of the dominant frequency counter, a clock pulse input end of the detector unit and a clock pulse input end of the Tp counter respectively; an output end of the dominant frequency counter is coupled to an input end of the detector unit through the comparator; an output end of the detector unit is coupled to an external input end of the dominant frequency counter and an external input end of the TRIM setter respectively; a frequency regulation signal TRIM is output from an output end of the TRIM setter and feedback to the slow oscillator;

the control signal of the function control module, after inversion by the inverter, is output to the detector unit, the TRIM setter, the output frequency controller and the Ts frequency divider;

an output end of the slow oscillator is coupled to a clear end of the dominant frequency counter, a clock pulse input end of the output frequency controller, a clock pulse input end of the Ts frequency divider, a clear end of the Tp counter and a clock pulse input end of the TRIM setter respectively; and two input ends of the first AND gate are coupled to output ends of the output frequency controller and the Tp counter respectively, and an output end of the first AND gate is configured to output the sampling signal.

6. The accelerator according to claim 5, wherein the detector unit comprises a first D type memory, a second D type memory, a third D type memory, a second OR gate and a multiplexer;

an output end of the first D type memory is coupled to an input end of the second D type memory and a first input end of the second OR gate respectively; a second input end of the second OR gate is coupled to an invert output end of the second D type memory; an output end of the second OR gate is coupled to one of input ends of the multiplexer; an output end of the multiplexer is coupled to an input end of the third D type memory; an output end and an invert output end of the third D type memory are both coupled to the input ends of the multiplexer; and the invert output end of the third D type memory serves as an output end of the entire detector unit.

7. The accelerator according to claim 1, wherein the accelerometer adopts an electrical bridge structure.

* * * * *